US009853927B2

United States Patent
Gourevitch et al.

(10) Patent No.: US 9,853,927 B2
(45) Date of Patent: Dec. 26, 2017

(54) ENFORCING RESOURCE QUOTA IN MAIL TRANSFER AGENT WITHIN MULTI-TENANT ENVIRONMENT

(71) Applicant: Microsoft Corporation, Redmond, WA (US)

(72) Inventors: Gregory Gourevitch, Redmond, WA (US); Faina Sigalov, Redmond, WA (US); Wilbert De Graaf, Bellevue, WA (US); Wayne Cranston, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 311 days.

(21) Appl. No.: 14/011,528

(22) Filed: Aug. 27, 2013

(65) Prior Publication Data

US 2015/0067069 A1    Mar. 5, 2015

(51) Int. Cl.
G06F 15/16 (2006.01)
H04L 12/58 (2006.01)
G06F 9/50 (2006.01)
H04L 29/06 (2006.01)

(52) U.S. Cl.
CPC .............. *H04L 51/12* (2013.01); *H04L 51/26* (2013.01); *G06F 9/505* (2013.01); *H04L 63/1458* (2013.01)

(58) Field of Classification Search
CPC ..... G06Q 10/107; H04L 12/585; H04L 12/58; H04L 12/581; H04L 12/5855; G06F 17/30008; G06F 17/30286; G06F 17/30575; G06F 17/30377

USPC .......................................... 709/206; 707/703
See application file for complete search history.

(56) References Cited

U.S. PATENT DOCUMENTS

| 2002/0120697 | A1* | 8/2002 | Generous | H04L 29/06 709/206 |
| 2003/0112819 | A1* | 6/2003 | Kofoed | H04J 3/12 370/431 |
| 2006/0026242 | A1* | 2/2006 | Kuhlmann | H04L 51/12 709/206 |
| 2009/0193120 | A1 | 7/2009 | Shin | |
| 2011/0246434 | A1* | 10/2011 | Cheenath | G06F 17/3038 707/703 |
| 2011/0289162 | A1* | 11/2011 | Furlong | H04L 51/12 709/206 |

(Continued)

OTHER PUBLICATIONS

"The Force.com Multitenant Architecture", Retrieved at: <<http://wiki.developerforce.com/page/Multi_Tenant_Architecture>>, Nov. 5, 2011, pp. 10.

(Continued)

*Primary Examiner* — Larry Donaghue
*Assistant Examiner* — Patrick Ngankam
(74) *Attorney, Agent, or Firm* — Turk IP Law, LLC

(57) ABSTRACT

An application such as a mail transfer agent (MTA) enforces a resource quota within a multi-tenant environment. An email associated with a tenant is managed based on decisions evaluating the email against a queue quota and an association between the email and an email storm. The email is also managed based on another decision evaluating the email against a processing quota. In addition, the email is managed based on a cross MTA aggregate of usage information associated with the first, second, and third decisions.

16 Claims, 7 Drawing Sheets

(56) References Cited

U.S. PATENT DOCUMENTS

| | | |
|---|---|---|
| 2011/0289581 A1 | 11/2011 | Gourevitch et al. |
| 2012/0089550 A1 | 4/2012 | Arora et al. |
| 2012/0150964 A1 | 6/2012 | Gourevitch et al. |
| 2012/0159514 A1 | 6/2012 | Sigalov et al. |
| 2015/0046279 A1* | 2/2015 | Wang ............... H04L 43/08 705/26.3 |

OTHER PUBLICATIONS

"Multi Tenant Database Application Platform", Retrieved at: <<http://www.wolfframeworks.com/multitenant.asp>>, Sep. 21, 2011, pp. 3.

"Resource Pooling", Retrieved at: <<http://securesoftwaredev.com/cloud-computing/resource-pooling/>>, Retrieved on: Jun. 3, 2013, pp. 2.

"International Search Report and Written Opinion Issued in PCT Patent Application No. PCT/US14/52432", dated Mar. 11, 2015, 12 Pages.

\* cited by examiner

ENFORCING RESOURCE QUOTA IN MAIL TRANSFER AGENT WITHIN MULTI-TENANT ENVIRONMENT

BACKGROUND

In a networked environment, email may be routed from a sending client over the network to one or more destination recipient mailbox servers. Conventional email routing involves routing an email message through mail transport agents or servers using simple mail transfer protocol (SMTP). Typically, when an email message passes through a mail transport agent, data associated with the email message may be only briefly stored on the mail transport agent for a period long enough to receive the email message from the sender, to process the email message, and to send the email message to the next server on the email transmission route.

Email applications are widely used by users on a variety of client devices for non-real time correspondence. With the proliferation of computing and networking technologies, email use has become an inextricable part of daily personal and professional lives. The increased reliance on email brings with it the disadvantage of how to deal with increasingly large numbers of emails. It is a common occurrence to receive, process, and transmit massive amounts of email through limited resources. In addition, subscription based services hosting email services further tax limited resources hosted by providers. Providers expand hardware and software platforms to meet demand in response to ever expanding email services. However, complications arise due to complex infrastructures needed to meet platform expansions. In certain scenarios, complicated solutions lead to device failure or unavailability because of poor management of vast hardware and software needed to meet the demand of entities accessing the services of email providers.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enforcing resource quota in a mail transfer agent (MTA) within a multi-tenant environment. According to some embodiments, an application, such an MTA may detect an email associated with a tenant and an excess email volume indicator. The excess email volume indicator may include a warning associated with approaching or exceeding a predetermined threshold associated with a volume of email managed by the MTA. The tenant may be an organization that is a customer or a subscriber of a service including email processing and similar ones. A first decision to manage the email may be derived based on evaluating the email against a queue quota associated with the tenant. The queue quota may be associated with an inbound queue or an outbound queue.

A second decision to manage the email may also be derived based on evaluating an association between the email and an email storm. Pattern detection may be used to suppress identified storms through a rejection of an email associated with the email storm. Furthermore, the MTA may derive a third decision to manage the email based on evaluating the email against a processing quota associated with the tenant. The processing quota may be used to limit resources such as a processor and a memory available to the tenant to process the email. Moreover, the email may be managed based on a cross MTA aggregate of usage information associated with the first, the second, and the third decisions.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
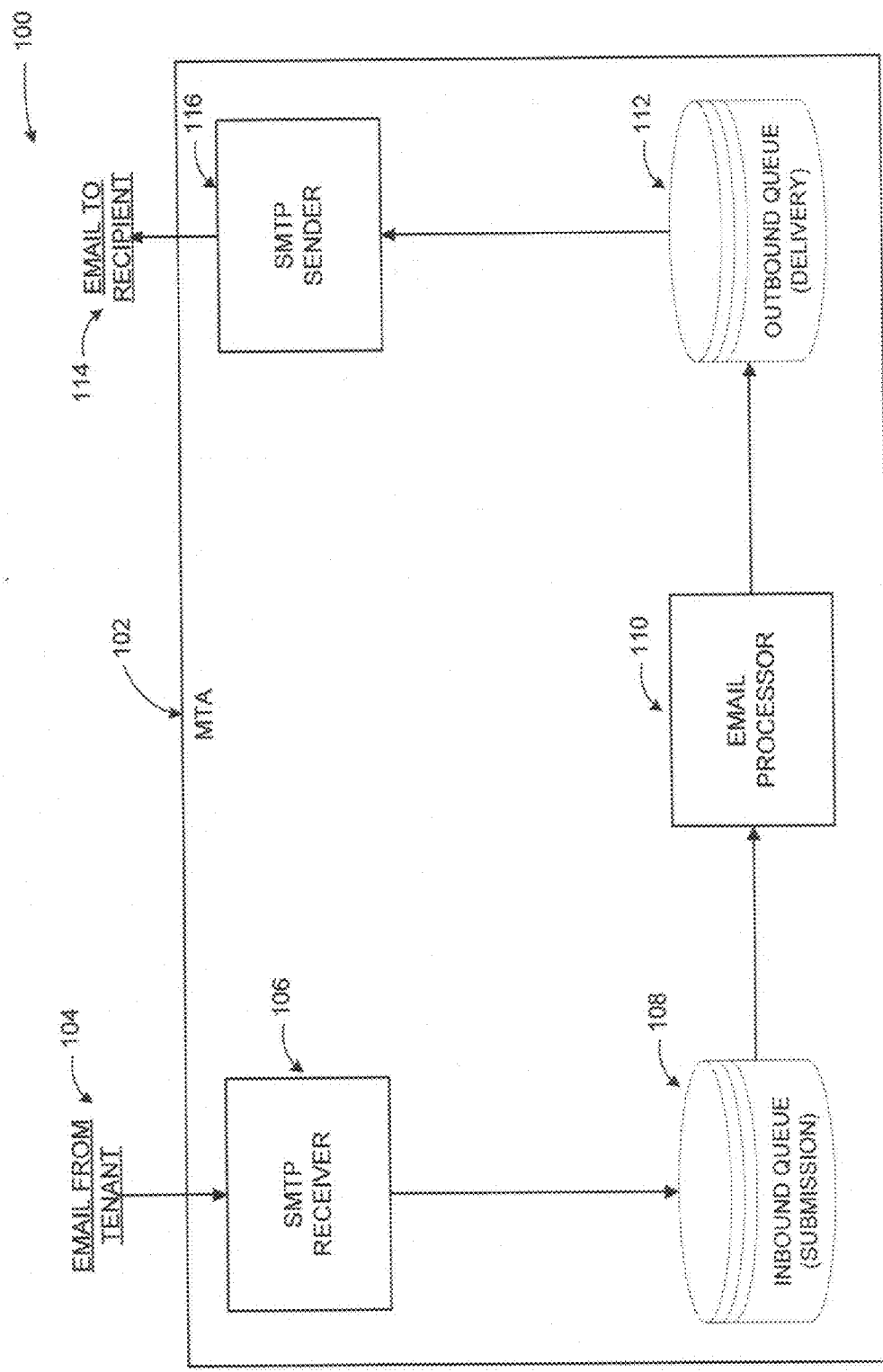
FIG. 1 illustrates an example concept diagram of enforcing resource quota in a mail transfer agent (MTA) within a multi-tenant environment according to some embodiments.

As briefly described above, an application, such as a mail transfer agent (MTA) may detect an email associated with a tenant. A first decision and a second decision to manage the email may be derived based on evaluating the email against a queue quota and an association between the email and an email storm, respectively. A third decision to manage the email may also be derived based on evaluating a processing quota. In addition, the email may be managed based on a cross MTA aggregate of usage information associated with the first, second, and third decisions.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for enforcing resource quota in a MTA agent within a multi-tenant environment. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example concept diagram of enforcing resource quota in a MTA within a multi-tenant environment according to some embodiments. The components and environments shown in diagram 100 are for illustration purposes. Embodiments may be implemented in various local, networked, cloud-based and similar computing environments employing a variety of computing devices and systems, hardware and software.

The MTA 102 may receive a message, such as an email, belonging to a tenant 104. A tenant may include an organization that is a customer or a subscriber of a service. The service may include email processing and similar ones. The email may be received by a simple mail transfer protocol (SMTP) receiver 106 component. The SMTP receiver 106 may receive the email and place the email in an inbound queue 108. The inbound queue 108 may also be identified as a submission queue. The inbound queue 108 may store the email until availability in email processor 110.

The email processor 110 may process the email. Email processing may include anti-virus, anti-spam, policy application, message routing, group expansion, and similar ones. Following processing, the email may be placed into the outbound queue 112 to avoid network communication traffic associated with exceeding an available bandwidth resource of the network. The outbound queue 112 (also known as a delivery queue) may store the email until the SMTP sender 116 transmits the email to a next hop to the recipient 114. The inbound queue 108 and the outbound queue 112 may have a quota associated with the tenant to manage the email.

The email may also be evaluated based on the queue quota associated with one or more users of the tenant. Furthermore, the SMTP sender 116 may transmit the email to a next hop to the recipient 114.

Embodiments are not limited to management of email by an MTA 102. Any type of message may be processed by an MTA using a processing quota, a queue quota, a storm suppression, and a cross MTA aggregate of usage information. In an example scenario, a short message service (SMS) message, a multimedia message server (MMS) message, an instant message, a text message, an audio message, a video message, and similar ones may be processed using an appropriate protocol for the associated message type through a transfer agent.

Figure 2:
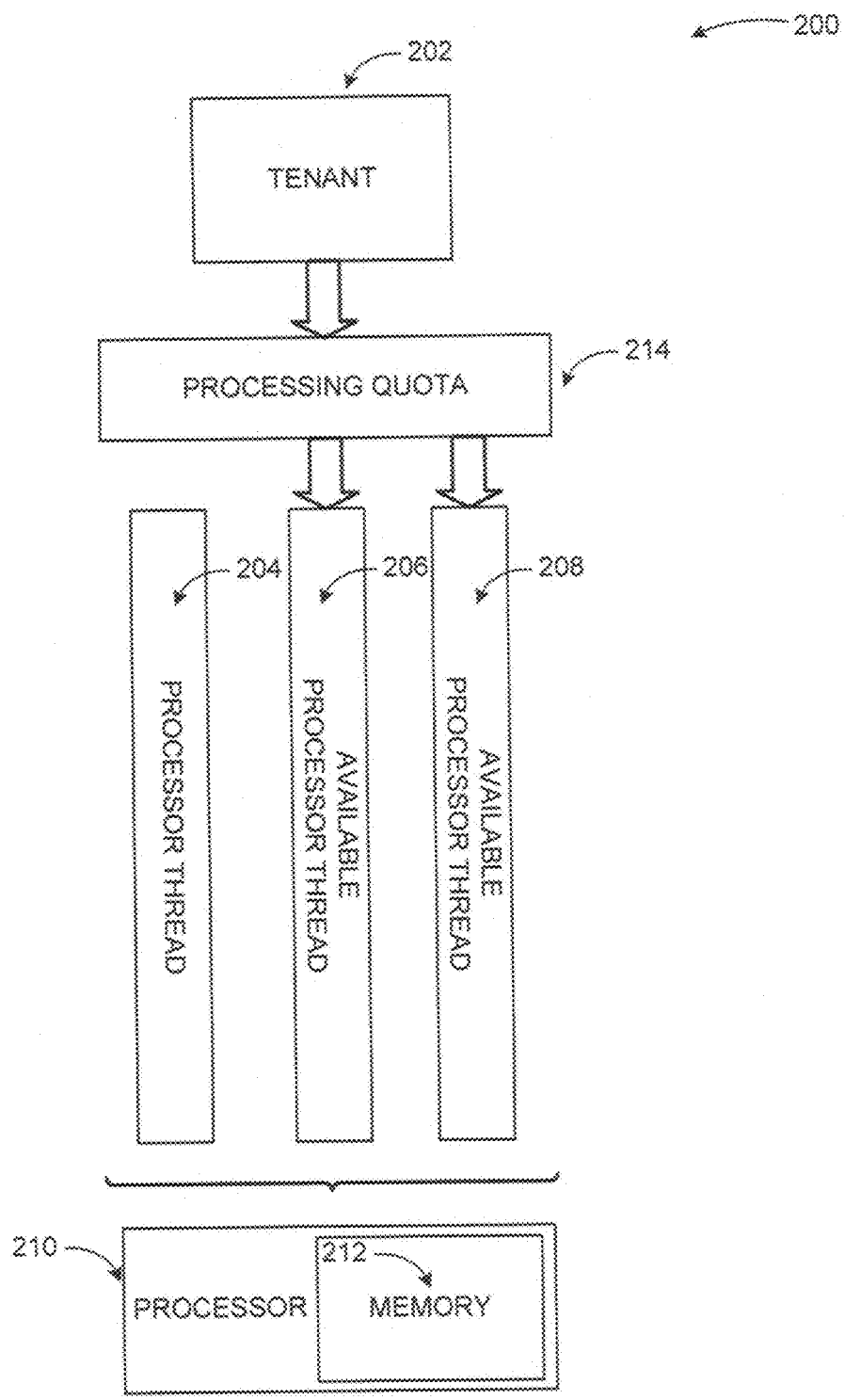
FIG. 2 illustrates an example of evaluating processing quota for an email associated with a tenant according to embodiments.

FIG. 2 illustrates an example of evaluating processing quota for an email associated with a tenant according to embodiments. Diagram 200 displays an email for a recipient that belongs to a tenant 202 being managed using a processing quota 214.

The processing quota 214 may limit amount of processor 210 and memory 212 available to the tenant 202. Processing resources including processor 210 and memory 212 may be limited by a maximum threads value (also known as MaxThreads) provided by the processor 210. The processor 210 may be limited to a maximum number of threads that it may execute at a given period. A value for available threads 206 and 208 (also known as AvailableThreads) may be determined using a value for used threads 204 (also known as UsedThreads). The AvailableThreads value may be calculated by AvailableThreads=MaxThreads−UsedThreads. The tenant 202 may be assigned a first percentage of the AvailableThreads. Users of the tenant may be assigned a second percentage of the AvailableThreads. Threads used by users of the tenant may be limited to remain within threads allocated to the tenant through a calculation of the first percentage>=the second percentage. In response to determining the first percentage<the second percentage, the MTA may keep the email associated with the users in an inbound queue. The email may be kept in an inbound queue in response to exceeding the first percentage. The second percentage may be used as an additional granularity on a user level to further restrict a quota level for a user.

The AvailableThreads may be adjusted dynamically based on a number of tenants using threads available through processor 210. Similarly, memory usage may be limited by the processing quota 214 using an available memory value (also known as AvailableMemory) determination. The AvailableMemory=MaxMemory (also known as maximum memory)−UsedMemory (aka used memory).

An email belonging to the tenant 202 at a front position within an inbound queue may be de-queued in a first in first out (FIFO) scheme in response to determining the tenant using a percentage of the AvailableThreads within the first percentage value for the AvailableThreads. Similarly, email belonging to the tenant 202 at a front position within an inbound queue may de-queued in a FIFO scheme in response to determining the tenant using a percentage of the AvailableMemory within the first percentage value for the AvailableMemory.

Furthermore, an email belonging to users of the tenant 202 at the front of an inbound queue may be de-queued in a FIFO scheme in response to determining the users using a percentage of the AvailableThreads within the second percentage value of the AvailableThreads. Similarly, email belonging to the tenant 202 at a front position within an inbound queue may de-queued in a FIFO scheme in response to determining the users using a percentage of the AvailableMemory within the first percentage value for the AvailableMemory.

Similar limitations may be evaluated for an outbound queue using a processing quota 214 for the outbound queue assigning percentage values to tenant or its users of AvailableThreads and AvailableMemory.

Moreover, historic measurements may be used in determining the first and the second percentage values for the tenant and its users. The historic measurements may be used to enforce de-queue decisions associated with email belonging to the tenant 202 and the users based on consumption patterns of resources associated with other tenants. Historically, low resource usage by other tenants may impact de-queue decisions associated with the tenant 202. If other tenants are not using resources, then it is less likely that tenant 202 can de-queue (e.g., cost may be equalized and if everyone's cost is low, the oldest may be selected). However, if all of the other tenants' costs are high, then tenant 202 may have a higher chance to be de-queued because they are using fewer resources than the other tenants.

The resources may include the processor 210 and the memory 212 associated with the processing quota 214 used in managing emails from the tenant 202 and its users. The first percentage value for the tenant 202 may be multiplied by a factor based on available resources, which may decrease any time resources are used. Similarly, emails from users of the tenant may be managed by multiplying the second percentage value with a decreasing factor in response to determining other users exceeding a historical threshold value associated with heavy usage of the memory 212.

Furthermore, the tenant 202 and one or more users of the tenant 202 may receive preferential treatment because the tenant may pay for email or similar services at a higher rate compared to other tenants. A percentage of the AvailableThreads or the AvailableMemory may be allocated to the tenant 202 or the users associated with the tenant 202. Alternatively, the first percentage for the tenant 202 and the second percentage for the users may be multiplied by an increase factor to allocate additional resources for the tenant 202 or its users using the processing quota 214 or a queue quota.

Figure 3:
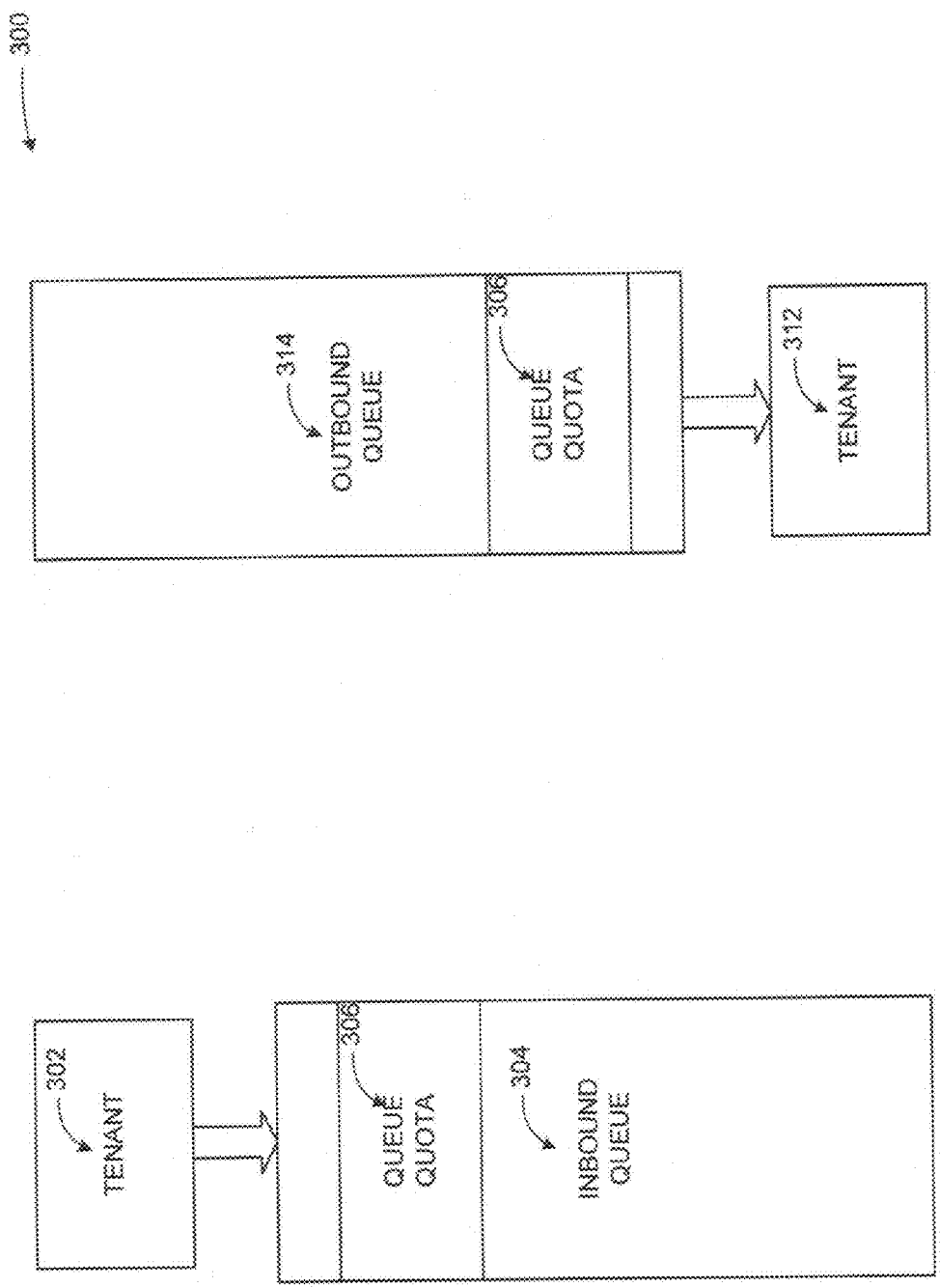
FIG. 3 illustrates an example of evaluating queue quota for an email associated with a tenant according to embodiments.

FIG. 3 illustrates an example of evaluating queue quota for an email associated with a tenant according to embodiments. Diagram 300 displays use of queue quota to manage emails through queues.

The MTA may manage an inbound email belonging to a tenant 302 through a queue quota 306 in an inbound queue 304. Similarly, an outbound email to tenant 312 may be managed through a queue quota 306 in an outbound queue 314. The queue quota 306 may be a quota value for all queues hosted by a server executing the MTA. An email may be temporarily rejected based on evaluation of the email against the queue quota 306. A decision such as a rejection may be determined based on maximum queue capacity (also known as MaxQueueCapacity) value of a server (or a device) hosting the inbound queue 304 or the outbound queue 314. MaxQueueCapacity may be subtracted from a used queue capacity value (also known as UsedQueueCapacity) measured for the tenant 302 or the tenant 312 or associated users to determine available queue capacity (also known as AvailableQueueCapacity) as a difference between the maximum queue capacity and the used queue capacity. As such, AvailableQueueCapacity=MaxQueueCapacity−UsedQueueCapacity. The tenant 302 and the tenant 312 may be assigned a first percentage of the AvailableQueueCapacity. In response to determining the tenant 302 or the tenant 312 using a queue percentage exceeding the first percentage, new emails from the tenant 302 or to the tenant 312 may be temporarily rejected and a retry error may be returned to the tenant 302 or a sender of the email sent to the tenant 312. Alternatively, in response to a determination of the tenant 302 or the tenant 312 using a queue percentage within the first and second percentages, the email may be stored in the inbound queue 304, the email may be transferred to a next hop, or delivered to mailboxes from outbound queue 314, respectively.

Similarly, users of the tenant 302 or the users of the tenant 312 may be assigned a second percentage of the AvailableQueueCapacity. In response to determining the users of tenant 302 or the users of the tenant 312 exceeding the allocated second percentage, emails from the users of the tenant 302 may be temporarily rejected and a retry message may be returned to the tenant 302. Emails to users of the tenant 312 may be rejected. In addition, the MTA may enforce the second percentage<=the first percentage through the queue quota 306. In response to determining the second percentage>the first percentage, the MTA may temporarily reject emails from the users of the tenant 302, as well as tenant 312, and return a retry error to achieve the second percentage<=the first percentage.

Measurements of queue usage for a tenant and its associated users are updated after placing an email in a queue and removing the email from the queue. In response to deriving a decision to reject emails from a tenant or its users, the decision is determined to remain in place until the measured usage percentage of a queue falls below a predetermined portion of the first or second percentages. The wait to have measured usage percentages to fall below the predetermined portion may be to prevent oscillations associated with throttling or un-throttling the tenant or the users frequently.

Figure 4:
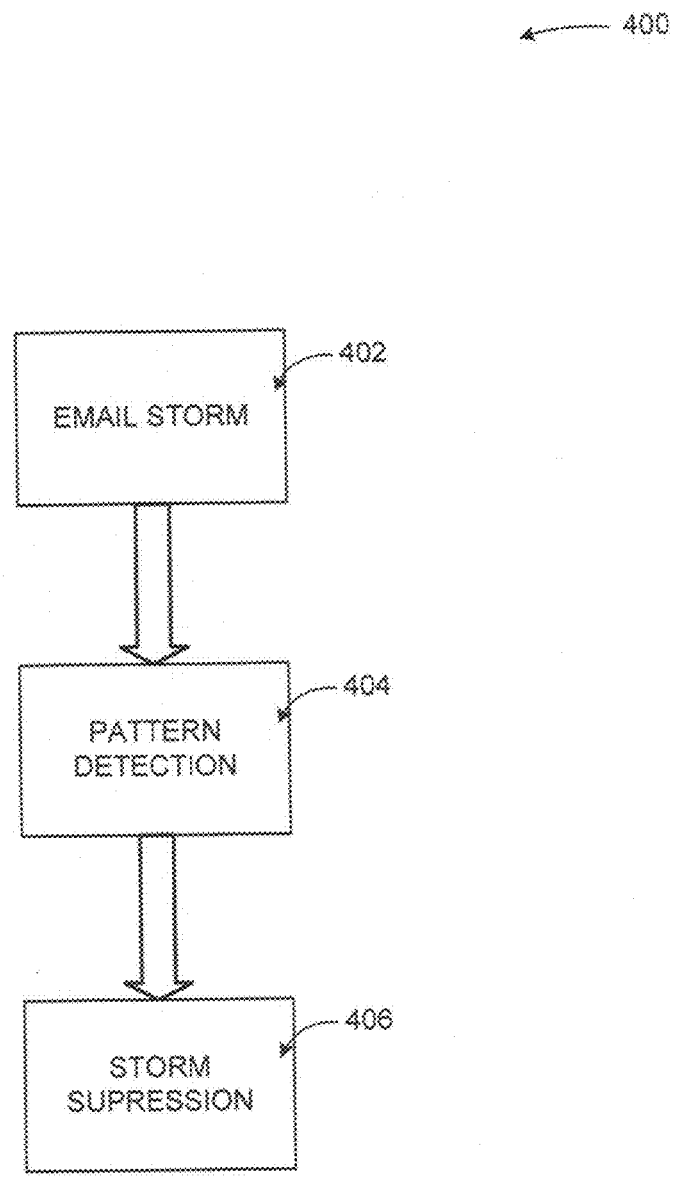
FIG. 4 illustrates an example of evaluating an association between the email and an email storm according to embodiments.

FIG. 4 illustrates an example of evaluating an association between the email and an email storm according to embodiments. Diagram 400 displays a storm suppression scheme.

The MTA may evaluate an email from the tenant or its users against email storm 402. The email storm 402 may be an attack on a resource to consume the resource without executing authorized operations. Alternatively, the email storm may occur because of an automated sender having a bug or an issue and emailing out of control due to the bug and/or the issue. An email storm 402 may be detected through a pattern detection 404 component. The pattern detection 404 component may use criteria including identification of a first set of emails from a previously identified sender to a previously identified recipient and a second set of emails with identical subject or similar subjects (common words) to identify the email storm 402. In addition, algorithms may be used to fingerprint complex patterns associated with the email storm 402. Examples of pattern detection 404 component are not provided in a limiting sense, other pattern detection 404 components may be used to detect email storm 402.

Additionally, emails belonging to a tenant may be stored in a queue in response to exceeding a processing quota during an email storm 402 associated with the tenant. Emails may be released from the queue in response to detecting available resources not exceeding the processing quota. However, new emails from the tenant may be temporarily rejected and a retry error may be sent to the tenant in response to exceeding a queue quota. New email may be accepted after detecting the tenant not exceeding the queue quota.

The pattern detection 404 component may evaluate attributes of an email to determine matching attributes between the email and the email storm 402. In response to determining the email matching the email storm 402, the MTA may apply storm suppression 406 rules including deleting the email, discarding the email, or rejecting the email. Any subsequent email matching the pattern of the email storm 402 may be submitted to the storm suppression 406 rules.

In addition, the MTA may apply distributed quota enforcement in association with additional MTAs or MTA instances executing in one or more devices. Usage information associated with a tenant or one or more of its users may be utilized to determine a cross MTA aggregate. The cross MTA aggregate may store decision information associated with evaluations of the email against a processing quota, a queue quota, and an email storm.

The cross MTA aggregate may include processing costs calculated in a central device capable of making faster decisions about the tenant and its users compared to peripheral devices managing email associated with the tenant or its users. The central device may receive usage information from multiple MTAs and evaluate resource usage across multiple MTAs by the tenant and its users. As a result, the central device may have comprehensive data associated with a tenant and its users compared to an individual MTA and may be at a better position to evaluate resource consumption by the tenant and its users compared to an individual MTA. The cross MTA aggregate may be transmitted to customers or subscribers to make policy decisions, make configuration changes, and reduce the resources consumed by the tenant or its users. In an example scenario, the central device may make a decision to reject email belonging to a tenant which may be enforced by MTA(s) receiving email belonging to the tenant or its users.

The example scenarios and schemas in FIG. 2 through 4 are shown with specific components, data types, and configurations. Embodiments are not limited to systems according to these example configurations. Enforcing resource quota in an MTA within a multi-tenant environment may be implemented in configurations employing fewer or additional components in applications and user interfaces. Furthermore, the example schema and components shown in FIG. 2 through 4 and their subcomponents may be implemented in a similar manner with other values using the principles described herein.

Figure 5:
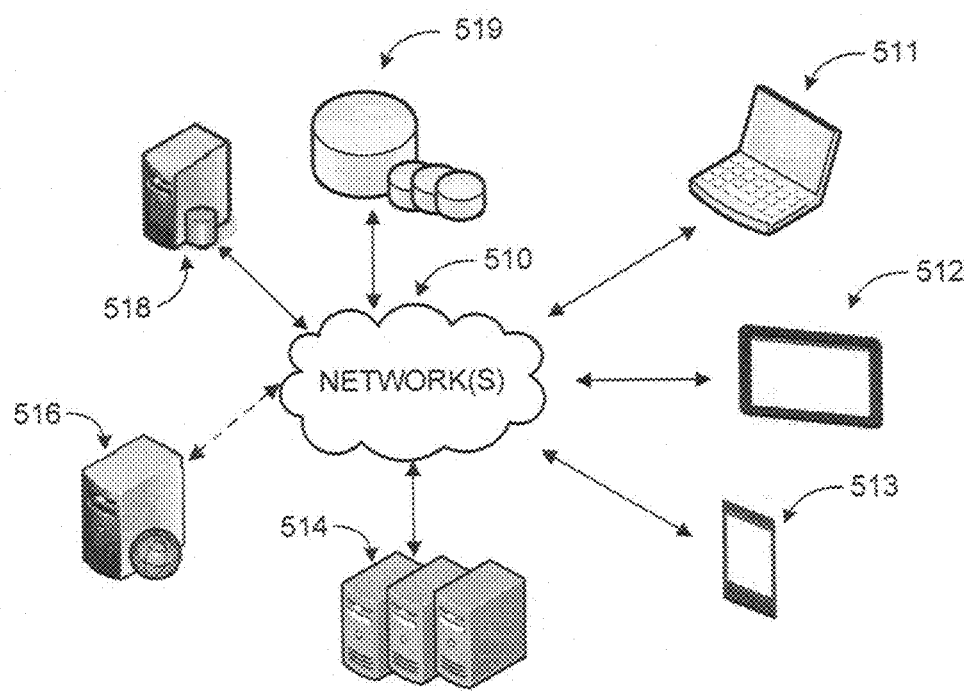
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application may execute on individual computing devices such as a smart phone 513, a tablet device 512, or a laptop computer 511 ('client devices') and communicate with email providers/recipients through network(s) 510.

As discussed above, an MTA may detect an email associated with a tenant and an excess email volume indicator. A first and a second decision may be derived to manage the email based on evaluating the email against a queue quota and an association between the email and an email storm. A third decision may also be derived to manage the email based on evaluating the email against a processing quota. The first, second, and third decisions may be used to manage the email through a cross MTA aggregate of usage information. Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to enforce a resource quota in an MTA within a multi-tenant environment. Furthermore, the networked environments discussed in FIG. 5 are for illustration purposes only. Embodiments are not limited to the example applications, modules, or processes.

Figure 6:
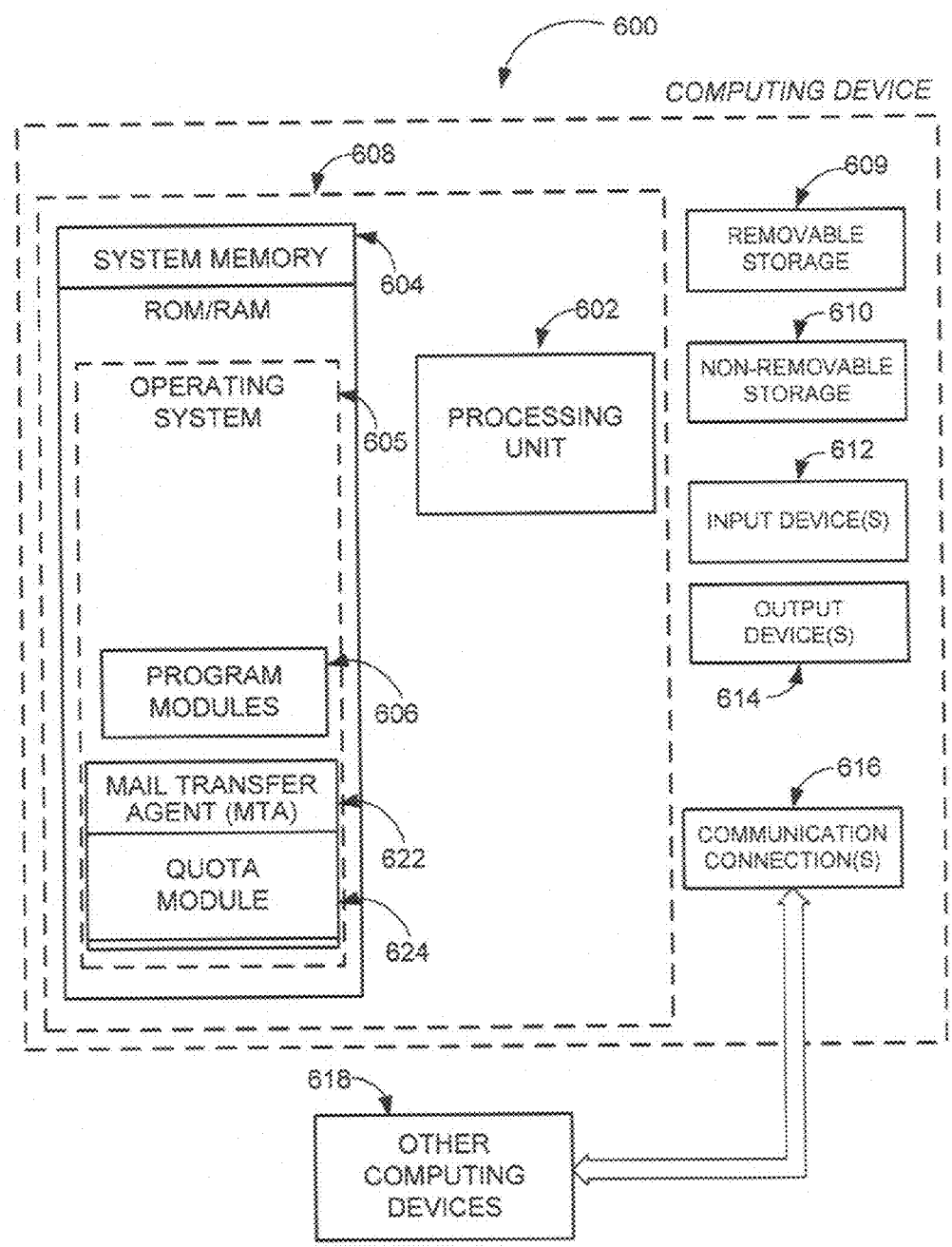
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, an MTA 622, and a quota module 624.

An MTA 622 may detect an email associated with a tenant and an excess email volume indicator. The MTA 622 may manage the email based on a first, a second, and third decision. The quota module 624 may evaluate the email against a queue quota and an association between the email and an email storm to derive the first and the second decisions. The quota module 624 may also evaluate the email against a process quota to derive the third decision. A cross MTA aggregate of usage information may also be used to manage the email by the MTA 622. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
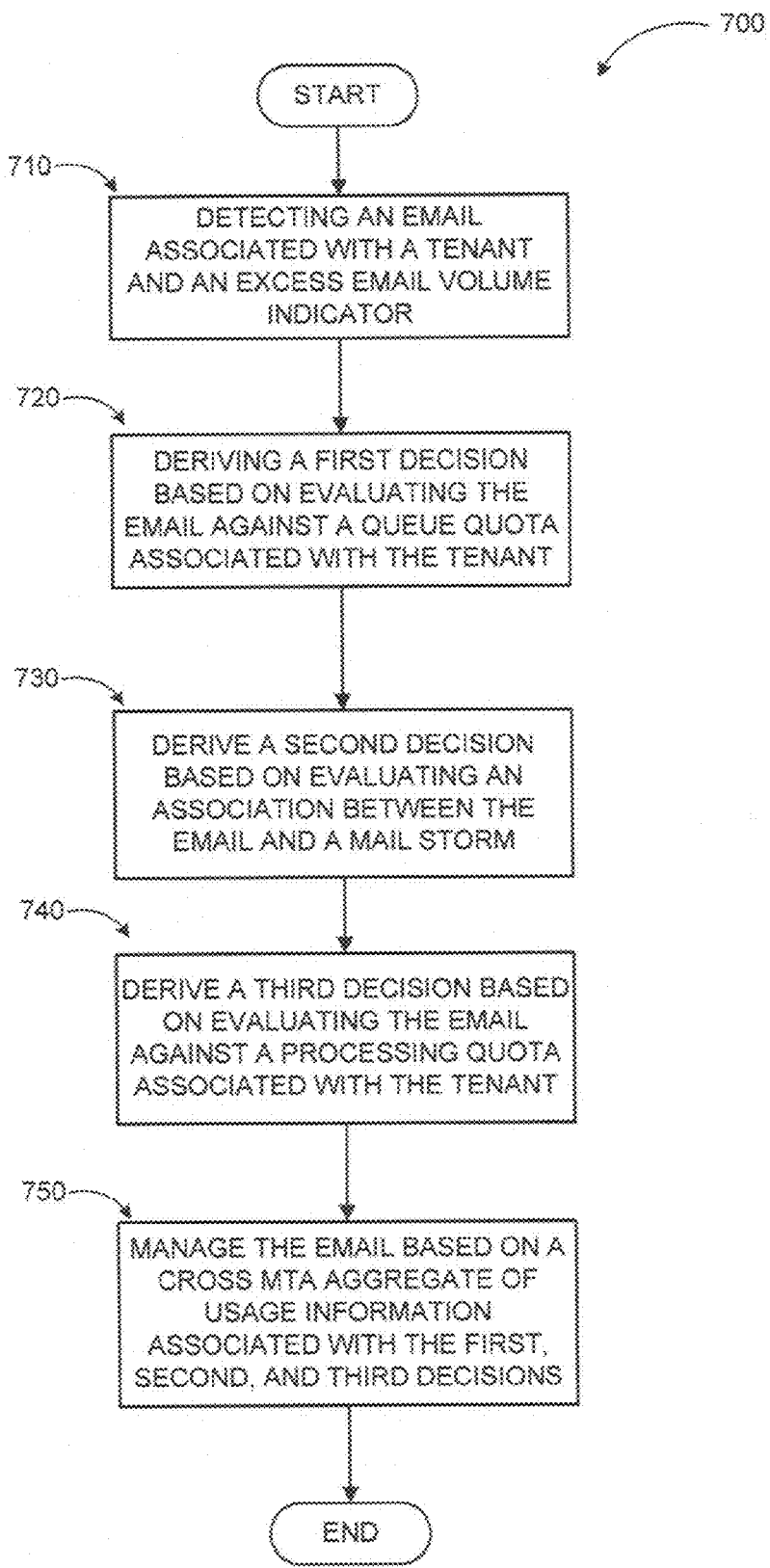
FIG. 7 illustrates a logic flow diagram for a process enforcing resource quota in a MTA within a multi-tenant environment according to embodiments.

FIG. 7 illustrates a logic flow diagram for a process enforcing resource quota in an MTA within a multi-tenant environment according to embodiments. Process 700 may be implemented by an MTA in some examples.

Process 700 may begin with operation 710 where the MTA may detect an email associated with a tenant and an excess email volume indicator. The excess email volume indicator may include a warning associated with approaching or exceeding a predetermined threshold associated with a volume of email managed by the MTA. Embodiments are not limited to an email or a tenant and may include messages and users of the tenant. At operation 720, the email may be managed based on a first decision evaluating the email against a queue quota associated with the tenant. The queue quota may evaluate the email against an inbound queue or an outbound queue. In addition, the email may be managed based on a second decision evaluating an association between the email and an email storm, at operation 730. In response to determining the association, the email may be temporarily rejected and a retry response may be sent to a sender.

At operation 740, the email may be managed based on a third decision evaluating the email against a processing quota associated with the tenant. The processing quota may include processor and memory components. Next, at operation 750, the email may be managed based on a cross MTA aggregate of usage information associated with the first, second, and third decisions.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Enforcing a resource quota in a MTA within a multi-tenant environment, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for enforcing a resource quota in a mail transfer agent (MTA) within a multi-tenant environment, the method comprising:
   detecting an email associated with a tenant and an excess email volume indicator;
   deriving a first decision based on evaluating the email against a queue quota associated with the tenant;
   deriving a second decision based on evaluating an association between attributes of the email and attributes of an email storm;
   deriving a third decision based on evaluating the email against a processing quota associated with the tenant by:
     determining, through a processor resource associated with the processing quota, a first percentage of available threads assigned to the tenant and a second percentage of the available threads assigned to at least one user of the tenant, and keeping the email within a queue in response to determining the first percentage to be less than the second percentage; and
   managing the email based on a cross MTA aggregate of usage information associated with the first decision, the second decision, and the third decision, wherein
   the available threads are dynamically adjusted based on a number of tenants using the available threads through the processor resource, and
   the first percentage and the second percentage of the available threads is multiplied by an increase factor to allocate additional resources for both the tenant and the at least one user of the tenant using the processing quota.

2. The method of claim 1, further comprising:
determining a maximum threads value associated with the processor resource managing the email;
determining a used threads value associated with the processor resource; and
calculating the available threads based on a difference between the maximum threads value and the used threads value.

3. The method of claim 1, further comprising:
de-queuing the email from a front position within a queue storing the email in response to determining the tenant using a percentage of the available threads within the first percentage.

4. The method of claim 1, further comprising:
determining a maximum memory value allocated to a system hosting the tenant;
determining a used memory value associated with the tenant; and
calculating an available memory value based on a difference between the maximum memory value and the used memory value across all tenants.

5. The method of claim 4, further comprising:
assigning a first percentage of the available memory to the tenant; and
assigning a second percentage of the available memory to at least one user of the tenant.

6. The method of claim 5, further comprising:
deriving the third decision including keeping the email within a queue in response to determining the first percentage to be less than the second percentage.

7. The method of claim 6, further comprising:
de-queuing the email from a front position within the queue storing the email in response to determining the tenant using a percentage of the available memory within the first percentage.

8. A computing device for enforcing a resource quota in a mail transfer agent (MTA) within a multi-tenant environment, the computing device comprising:
a memory configured to store instructions; and
a processor coupled to the memory, the processor executing the MTA in conjunction with the instructions stored in the memory, wherein the MTA is configured to:
detect an email associated with a tenant and an excess email volume indicator;
derive a first decision based on evaluating the email against a queue quota assigned to the tenant;
derive a second decision based on evaluating an association between attributes of the email and attributes of an email storm;
evaluate the email against a processor resource of the one or more resources and an email resource of the one or more resources, wherein the email resource is associated with a processing quota assigned to the tenant;
derive a third decision based on the evaluation of the email against the processing quota assigned to the tenant by:
determine, through the processor resource associated with the processing quota, a first percentage of available threads assigned to the tenant and a second percentage of the available threads assigned to at least one user of the tenant, and keep the email within a queue in response to determining the first percentage to be less than the second percentage; and
manage the email based on a cross MTA aggregate of usage information associated with the first decision, the second decision, and the third decision, wherein
the available threads are dynamically adjusted based on a number of tenants using the available threads through the processor resource, and
the first percentage and the second percentage of the available threads is multiplied by an increase factor to allocate additional resources for both the tenant and the at least one user of the tenant using the processing quota.

9. The computing device of claim 8, wherein the MTA is further configured to:
determine a maximum queue capacity of a queue associated with the MTA;
determine a used queue capacity of the queue; and
determine an available queue capacity based on a difference between the maximum queue capacity and the used queue capacity.

10. The computing device of claim 9, wherein the MTA is further configured to:
assign a first queue percentage of the available queue capacity to the tenant; and
reject the email temporarily and return a retry message, in response to a determination of the tenant using a queue percentage exceeding the first queue percentage.

11. The computing device of claim 10, wherein the MTA is further configured to:
assign a second queue percentage of the available queue capacity to at least one user of the tenant; and
reject the email temporarily and return a retry message, in response to determining the second queue percentage to be greater than the first queue percentage.

12. The computing device of claim 8, wherein the MTA is further configured to:
identify the email storm using a pattern having criteria including at least one of: a first set of emails from a previously identified sender to a previously identified recipient and a second set of emails with an identical subject.

13. A computer-readable memory device with instructions stored thereon for enforcing a resource quota in a mail transfer agent (MTA) within a multi-tenant environment, the instructions, when executed on a processor of a computing device configured to manage email exchange, cause the processor to perform actions that include:
detecting an email associated with a tenant and an excess email volume indicator;
evaluating the email against a queue including at least one of: an inbound queue and an outbound queue associated with a queue quota assigned to the tenant;
deriving a first decision based on evaluating the email against a queue quota assigned to the tenant;
deriving a second decision based on evaluating an association between attributes of the email and attributes of an email storm;
evaluating the email against a processor resource of the one or more resources and a memory resource of the one or more resources, wherein the memory resource is associated with a processing quota assigned to the tenant;
deriving a third decision based on evaluating the email against the processing quota assigned to the tenant by:
determining, through the processor resource associated with the processing quota, a first percentage of available threads assigned to the tenant and a second percentage of the available threads assigned to at least one user of the tenant, and keeping the email within a queue in response to determining the first percentage to be less than the second percentage; and managing the email based on a cross MTA aggregate of usage information associated with the first decision, the second decision, and the third decision wherein the available threads are dynamically adjusted based on a number of tenants using the available threads through the processor resource, and the first percentage and the second percentage of the available threads is multiplied by an increase factor to allocate additional resources for both the tenant and the at least one user of the tenant using the processing quota.

14. The computer-readable memory device of claim 13, wherein the instructions further comprise:

computing processing costs associated with the cross MTA aggregate in a central device in association with additional MTAs enforcing the processing quota assigned to the tenant.

15. The computer-readable memory device of claim 14, wherein the instructions further comprise:

transmitting the cross MTA aggregate to the tenant to enable the tenant to make policy decisions based on usage information.

16. The computer-readable memory device of claim 13, wherein the instructions further comprise:

detecting the excess email volume indicator including a warning associated with one of: approaching and exceeding a predetermined threshold associated with a volume of email managed by the MTA.

* * * * *